July 13, 1937. E. P. BULLARD 2,086,848
LOCK PIN ASSEMBLY
Filed Aug. 16, 1935 2 Sheets-Sheet 1

INVENTOR.
E. P. BULLARD
BY
A. T. Sperry
ATTORNEY

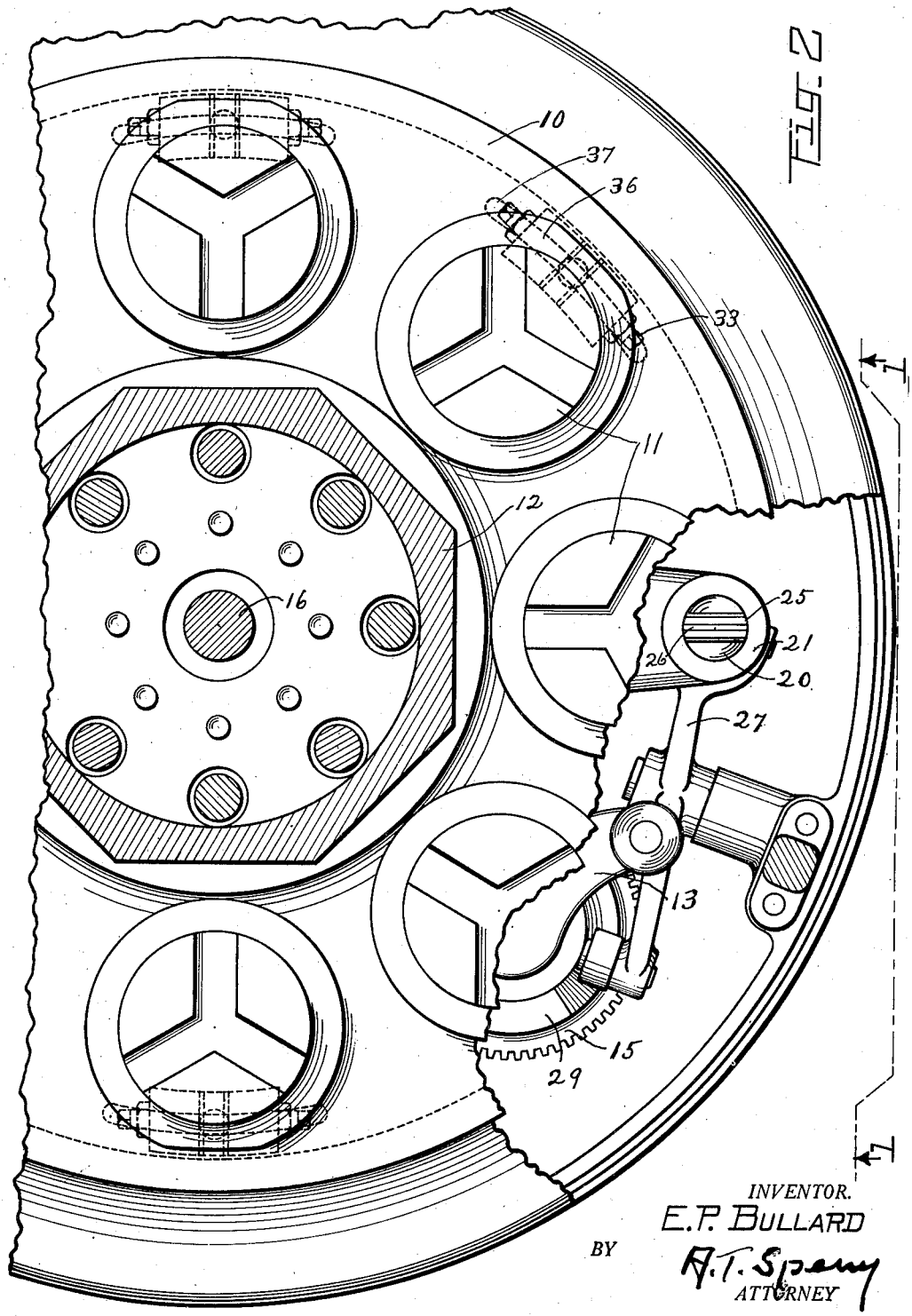

Patented July 13, 1937

2,086,848

UNITED STATES PATENT OFFICE 2,086,848

LOCK PIN ASSEMBLY

Edward P. Bullard, Fairfield, Conn., assignor to The Bullard Company, a corporation of Connecticut Application August 16, 1935, Serial No. 36,459

5 Claims. (Cl. 29—50)

This invention relates to lock pin assemblies and is particularly concerned with locking means for movable elements of machine tools and, while herein shown and described by way of illustration as applied to multiple station machine tools.

The invention is applicable in general to a mechanism having an element which is movable from one position or station to another and which is held in at least one of said positions with the parts accurately located so that a machining or other operation may be properly performed. Among the elements of machine tools which have such movement and to which the invention is particularly applicable is the carrier by which the work of a multiple operation machine tool is moved from station to station by an indexing mechanism. In particular the invention is applicable to machine tools of the type set forth in application for Machine tool, Serial Number 108,494, filed October 30, 1936, and to indexing mechanism such as set forth in application for Double index mechanism, Serial Number 65,409, filed February 24, 1936.

Among the objects of the present invention is to insure accuracy of location of a movable element of a machine tool when moved from one station or position to another.

Another object of the invention is to provide for adjustment of cooperating locking elements by which the carrier of a multiple operation machine tool is retained in position during machining operations.

Another object of the invention is to provide simple and inexpensive means for such adjustment thus to compensate for variations due to wear, warping or other factors which may tend to alter the desired position thereof.

Another object is to provide locking means adjustable with respect to their support so that they may be applied and located after assembly of the machine and may be adjusted independently of each other so as to compensate for imperfections in the casting, drilling or machining of original parts.

In the drawings:

Figure 2 is a horizontal sectional view of the mechanism illustrated in Figure 1.

Figure 1:
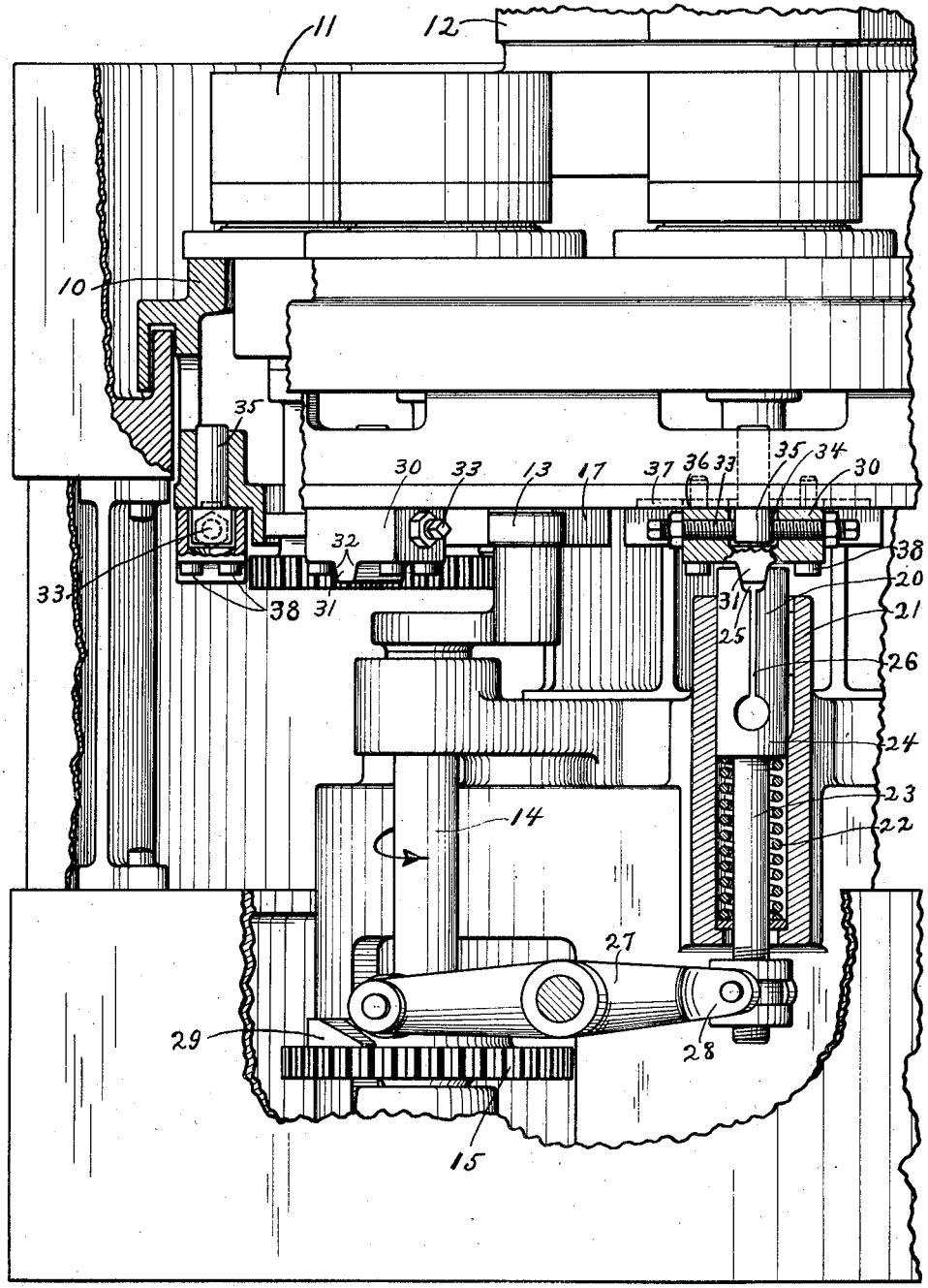
Figure 1 is a vertical sectional view of a portion of a machine tool embodying the invention taken on the line 1—1 of Figure 2.

In general terms that form of the invention, herein illustrated, includes the combination with an indexible table of a machine tool, such as the spindle carrying table, of locking bits carried by positioning blocks adjustably secured to the table, adjustment being provided by a threaded variable engagement between the positioning blocks and centering pins carried by the table. The blocks are here shown as being of a general rectangular longitudinal section and have a threaded bolt extending inward from each end into a pin receiving recess of the block, which recess is larger than the head of the pin so that by compensated adjustment of the screws, the relation of the block with respect to the pin may be varied. The block is preferably secured to the carrier in its adjusted position by bolts extending vertically upward therethrough and into the carrier. The indexing mechanism, shown by way of illustration for giving the carrier a step-by-step movement, is illustrated as a simple, Geneva crank, certain features of which form a basis of the copending application hereinbefore referred to. The combination also includes a spring-urged lock pin having a bi-furcated portion adapted to engage a projecting bit on the positioning block, the walls of which bit cooperate with similar walls of the furcation to provide a camming action. The construction of the furcation is such as to further provide a resiliency between the walls so as to more firmly grip the bit; and the locking pin, itself, is normally under spring tension which urges it into locking position and from which it is moved in sequence with the movement of the indexing arm.

Referring to the drawings, the invention is depicted as applied to a vertical multiple spindle machine tool wherein there is a spindle carrier 10 having work holding spindles 11 carried thereby and rotatable therewith about a central column 12. The carrier is rotated progressively to bring the work carried by each spindle into position to be operated upon successively by each of a number of tools (not shown) as in the usual operation of such machines. The mechanism employed for indexing in the construction shown embodies a crank arm 13 carried by a shaft 14 and driven during the indexing cycle from a gear 15 from any suitable driving shaft such as a central indexing shaft 16. The crank arm is rotated to engage plates 17 carried by the spindle carrier to move the same intermittently from station to station with a Geneva movement. However, any other suitable form of indexing mechanism may be employed for effecting the desired movement of the spindle carrier or other element with which the invention is associated.

Between successive movements of the carrier and during the machining operation the carrier is locked in position by means of a locking pin 20 mounted for movement in a guide 21 carried by a stationary portion of the machine. The pin is urged upwardly into its operative position by a spring 22 surrounding its shank 23 and bearing at one end against the head 24 of the pin. The head of the pin is split to form a furcation 25 presenting inclined faces which serve as cams to shift the spindle carrier slightly to either side as necessary to effect accurate placement thereof after completion of an indexing movement. The head of the pin 20 may also be provided with a longitudinal slot 26 or be otherwise formed to provide a limited degree of resilience insuring a continuous firm grip by the pin and a cushioning action when the pin is applied.

Movement of the pin 20 to permit indexing of the spindle carrier is effected by a pivoted cam operating lever 27 secured at 28 to the lower end of the shank 23 of the pin and provided at the opposite end with a roller for engaging the pin operating cam 29. The cam 29 may be formed on the upper surface of the gear 15 by which the shaft 14 and the indexing crank arm 13 are rotated. The position of the cam is such that the pin is retracted prior to the beginning of the indexing movement, that is, before the crank arm 13 moves into engagement with one of the plates 17. Rotation of the gear 15 in the direction of the arrow in Figure 1 and in a counter-clockwise direction as seen in Figure 2 causes the roller on the end of lever 27 to be raised and the pin 20 retracted against the action of spring 22. The cam 29 is so formed that upon the completion of an indexing or like movement of the movable element with which the invention is associated the roller is permitted to rock back to the position shown in Figure 1 under the action of spring 22 and the pin is projected into engagement with a bit or positioning member on the spindle carrier.

For locking the carrier to the table when the pin is raised there is provided a series of positioning blocks 30 one for each station of the carrier and each having a depending tapered bit 31. An important feature of the invention is that these blocks may be separately applied to the carrier and adjusted thereon after assembly of the machine. The bits 31 shown in the drawings are formed on the blocks 30 and present inclined surfaces 32 which cooperate with the inclined surfaces of furcations 25 of the locking pin to shift the carrier as necessary to insure the desired accurate positioning of the spindles and carrier. The positioning blocks 30 are each provided with adjusting screws 33 extending inwardly on opposite sides thereof into a recess 34 which receives the head of a centering pin 35 fixedly secured to the carrier. The recesses are larger than the heads of the centering pins so that the blocks may be adjusted relative thereto by advancing one of the screws 33 and retracting the other until the block has been moved to the desired position. The upper faces of the blocks are formed with keys 36 projecting into keyways 37 on the lower face of the carrier to prevent displacement thereof radially while permitting the blocks to be accurately located circumferentially by adjustment of the screws 33 engaging the centering pins 35. When properly positioned, the blocks are secured in place on the carrier by screws or other securing means 38 extending through the blocks 30 and into holes tapped in the lower face of the carrier on opposite sides of the keyways.

With the construction described the location of the positioning blocks 30 and bits 31 can be established for each machine and for each station of each machine independently and accurately and the carrier tapped accordingly to receive the pins 38. In the event wear or warping of the mechanism should occur or it should be desirable to alter the position of the positioning members for any other reason the bolts or pins 38 are loosened or removed, the adjusting screws 33 advanced or withdrawn to establish a new position for the blocks 30 and the bits 31 and the pins 38 replaced to retain the block in its new position on the carrier. Adjustment or compensation for wear or warping of the carrier is thus rendered very simple and inexpensive and accuracy in operation of the machine is assured.

In a similar way the invention may be applied to other elements and types of machine tools and indexible members to position the same initially or to compensate for wear, warping or other factors which may cause the mechanism to function improperly.

Although the invention has been described herein as applied to a particular type of machine tool and as embodying certain preferred elements it will be apparent that the invention is not restricted to its use in the particular form shown or in the particular relation described. It should therefore be understood that the foregoing description and showing thereof is intended to be illustrative of the invention and is not intended to limit the scope thereof.

What I claim is:

1. In a lock pin assembly for machine tools, a locking element comprising a block, a pin loosely receivable within said block, and a pair of opposite, threadedly adjustable members mounted in said block and engageable with said pin to locate the block with respect thereto, and a lock pin engaging surface on said block.

2. In a multiple spindle machine tool having a carrier for the spindles thereof, indexing mechanism for moving said carrier, locking means for holding said carrier against displacement and means for positioning the carrier comprising a lock pin bit mounted on the spindle carrier and movable therewith, a cooperating lock pin mounted on a stationary portion of the machine and formed with a cam surface movable into engagement with the lock pin bit to provide limited additional movement of the carrier and adjusting means for altering the position of said lock pin bit with respect to said carrier and means for securing said bit to said table in adjusted position.

3. In a machine tool having an indexible table means for locking and positioning said table comprising a lock pin bit, a positioning block by which said bit is carried, adjustable means for altering the position of said block with respect to said table, attaching means for securing the block to said table in its adjusted position and a lock pin movable to engage said bit, said lock pin and bit having cooperating resilient cam surfaces thereon for shifting the table a limited distance to position the same.

4. In a multiple spindle machine tool having a carrier for the spindles thereof movable from one position to another, means for indexing said carrier and means for locking and positioning said carrier in its indexed positions comprising a centering pin fixedly secured to the carrier, a lock pin bit, a positioning block by which said lock pin bit is carried having adjustable screws thereon for engaging said lug to position said block, means for securing said block to the carrier in its adjusted position and a lock pin having a cam surface thereon movable to engage said lock pin bit to position the carrier and secure the same against displacement.

5. In a machine tool the combination with a multiple spindle carrier of a crank arm for indexing the carrier and locking bolt movable with said crank arm to move in the direction of the carrier at right angles thereto and in a rectilinear path at the expiration of the movement of the carrier by the crank arm, said bolt being furcated to provide resilient furcations and said carrier being provided with independently adjustable bit carrying members and the bits are receivable between the furcations of the bolt when the same is thrust to locking position, said bit carrying members being adjustable with respect to fixed members mounted in the carrier by means of threaded adjusting devices mounted in said bit carrying members.

EDWARD P. BULLARD.